US010532454B2

(12) United States Patent
Kamiya et al.

(10) Patent No.: US 10,532,454 B2
(45) Date of Patent: Jan. 14, 2020

(54) ELECTRIC WORKING MACHINE

(71) Applicant: MAKITA CORPORATION, Anjo-shi, Aichi (JP)

(72) Inventors: Shingo Kamiya, Anjo (JP); Haruki Tejima, Anjo (JP); Takao Kuroyanagi, Anjo (JP); Masanori Higashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 265 days.

(21) Appl. No.: 15/597,437

(22) Filed: May 17, 2017

(65) Prior Publication Data

US 2017/0334054 A1     Nov. 23, 2017

(30) Foreign Application Priority Data

May 18, 2016   (JP) ................................. 2016-099837

(51) Int. Cl.
| | |
|---|---|
| *B25F 5/00* | (2006.01) |
| *H02P 29/032* | (2016.01) |
| *H02K 7/108* | (2006.01) |
| *H02K 7/14* | (2006.01) |
| *H02P 6/08* | (2016.01) |

(52) U.S. Cl.
CPC .............. *B25F 5/001* (2013.01); *H02K 7/108* (2013.01); *H02K 7/145* (2013.01); *H02P 29/032* (2016.02); *H02P 6/085* (2013.01)

(58) Field of Classification Search
CPC ....... B25B 23/147; B25F 5/001; H02K 7/108; H02P 6/08

USPC ........ 173/4, 5, 2, 1, 183; 475/298, 263, 275, 475/320, 330, 317, 264
See application file for complete search history.

(56) References Cited

U.S. PATENT DOCUMENTS

| | | | | |
|---|---|---|---|---|
| 2005/0109519 | A1* | 5/2005 | Kawai | B25B 21/026 173/183 |
| 2009/0071671 | A1* | 3/2009 | Zhong | B23B 45/008 173/176 |
| 2010/0065293 | A1* | 3/2010 | Lohr | B25B 23/147 173/1 |
| 2012/0169256 | A1* | 7/2012 | Suda | B25B 21/00 318/17 |
| 2012/0191250 | A1* | 7/2012 | Iwata | B25F 5/00 700/275 |
| 2013/0062088 | A1* | 3/2013 | Mashiko | B25B 21/02 173/2 |

(Continued)

FOREIGN PATENT DOCUMENTS

JP        2002-154062 A     5/2002

*Primary Examiner* — Nathaniel C Chukwurah
(74) *Attorney, Agent, or Firm* — Oliff PLC

(57) ABSTRACT

An electric working machine according to one aspect of the present disclosure includes an output shaft, a motor, a transmitting device, a drive device, a controller, and a current path. The transmitting device has transmittable allowable torque and transmits rotation of the motor to the output shaft. The drive device energizes the motor with electric supply from a battery in accordance with a command from outside the electric working machine. The current path is configured to be able to energize the motor with a current value larger than an allowable current value required to limit torque generated in the transmitting device due to rotation of the motor to the allowable torque or smaller.

4 Claims, 6 Drawing Sheets

(56) References Cited

U.S. PATENT DOCUMENTS

2013/0269961 A1\* 10/2013 Lim ................. B25F 5/001
                                                      173/1
2013/0284475 A1\* 10/2013 Hirabayashi ........... B25F 5/008
                                                      173/47

\* cited by examiner

ELECTRIC WORKING MACHINE

CROSS-REFERENCE TO RELATED APPLICATION

This application claims the benefit of Japanese Patent Application No. 2016-099837 filed on May 18, 2016 with the Japan Patent Office, the disclosure of which is incorporated herein by reference.

BACKGROUND

The present disclosure is related to an electric working machine configured to drive a motor with power supply from a battery.

The electric working machine disclosed in Japanese Unexamined Patent Application Publication No. 2002-154062 is configured to transmit rotation of a motor to an output shaft via a transmitting device including deceleration gears.

SUMMARY

The electric working machine configured as described above requires, for example, large gears of the transmitting device in order to improve a drive capability of the output shaft. However, the large gears may enlarge the transmitting device and, consequently, the electric working machine.

It is preferable that one aspect of the present disclosure can provide a technique that can improve the drive capability of the output shaft without enlarging the electric working machine.

An electric working machine according to one aspect of the present disclosure comprises a motor, a transmitting device, a drive device, a detector, and a controller. The transmitting device is configured to transmit rotation of the motor to an output shaft. The drive device is configured to energize the motor with electric supply from a battery. The detector is configured to detect a value of motor current flowing in the motor via the drive device. The controller is configured to control driving of the motor via the drive device in accordance with a command from outside the electric working machine. The controller is further configured to control driving of the motor such that the value of the motor current detected by the detector becomes equal to or smaller than a specified upper limit current value so as to protect the transmitting device.

The electric working machine configured as described above can inhibit damage on the transmitting device by limiting the upper limit current value of the motor current even when a maximum torque that can be generated by the motor is larger than the allowable torque transmittable by the transmitting device due to a voltage of the battery, a structure of the motor and/or a structure of the drive device.

In other words, with the technique of the present disclosure, the motor current can be limited to the upper limit current value or smaller so as to reduce torque to be applied to the transmitting device and the transmitting device can be protected.

In the electric working machine, a current path extending from the battery via the drive device to the motor may be configured to be able to energize the motor with a current value larger than an allowable current value required to limit the torque generated in the transmitting device due to rotation of the motor to an allowable torque or smaller that is transmittable by the transmitting device.

The upper limit current value may be set to be smaller than the allowable current value.

In this case, torque larger than the allowable torque can be inhibited from being applied to the transmitting device so as to protect the transmitting device.

"To be able to energize the motor with a current value larger than the allowable current value" means that the motor can be at least momentarily energized with a current value larger than the allowable current value that is required to limit the torque generated in the transmitting device to the allowable torque (i.e., a mechanically allowable torque in the transmitting device) or smaller.

In other words, for a current value that can energize the motor, a first current threshold that can momentarily energize the motor and a second current threshold that can constantly and continuously energize the motor are known.

The first current threshold is a current value in which, a magnet of the motor is demagnetized and a performance of the motor is reduced when the electric current flows in the motor for a short period of time. The second current threshold is a current value that is smaller than the first current threshold and causes failure of the motor if the electric current is continuously provided to the motor for a specific period of time or longer.

The above description indicates that at least the first current threshold is larger than the allowable current value.

Accordingly, the technique of the present disclosure can protect the transmitting device irrespective to the second current threshold being smaller or larger than the allowable current value.

Moreover, the controller may be configured to stop driving of the motor when the value of the motor current detected by the detector reaches the upper limit current value. In this case, stopping driving of the motor can more reliably inhibit torque larger than the allowable torque from being applied to the transmitting device due to rotation of the motor as compared to a case in which the motor is rotated while the value of the motor current is limited to the upper limit current value or smaller.

The transmitting device may have a variable deceleration ratio for transmitting rotation of the motor to the output shaft, and may be configured to vary the deceleration ratio by externally operating the transmitting device. In this case, the controller may be configured to vary the upper limit current value in accordance with the deceleration ratio of the transmitting device such that the upper limit current value decreases with an increase in the deceleration ratio.

In other words, when the deceleration ratio of the transmitting device is large, the number of revolution of the output shaft decreases and the torque applied to the transmitting device increases as compared to a case in which the deceleration ratio is small. Accordingly, by the upper limit current value being varied in accordance with the deceleration ratio as described above, the torque applied to the transmitting device can be further inhibited from becoming larger than the allowable torque.

Alternatively, the controller may be configured to control driving of the motor such that, while the deceleration ratio of the transmitting device is in a large state, the value of the motor current detected by the detector is equal to or smaller than the upper limit current value.

With this configuration, driving of the motor can be also controlled such that the value of the motor current becomes the upper limit current value or smaller under conditions in which the deceleration ratio of the transmitting device is large and the torque applied to the transmitting device becomes larger than in a case in which the deceleration ratio is small. Accordingly, torque larger than the allowable torque can be inhibited from being applied to the transmitting device.

An electric working machine according to another aspect of the present disclosure comprises an output shaft, a motor, a transmitting device, a drive device, a controller, and a current path. The transmitting device has transmittable allowable torque and is configured to transmit rotation of the motor to the output shaft. The drive device is configured to energize the motor with electric supply from a battery. The controller is configured to control driving of the motor via the drive device in accordance with a command from outside the electric working machine. The current path extends from the battery via the drive device to the motor and is configured to be able to energize the motor with a current value larger than an allowable current value required to limit torque generated in the transmitting device due to rotation of the motor to the allowable torque or smaller.

Since the electric working machine configured as described above can energize the motor with the current value larger than the allowable current value, a drive capability of the output shaft can be improved without the electric working machine being enlarged.

The electric working machine may comprise a detector configured to detect a value of motor current flowing in the motor via the drive device. In this case, the controller may be further configured to control driving of the motor such that the value of the motor current detected by the detector is equal to or smaller than an upper limit current value that is smaller than the allowable current value.

The electric working machine configured as described above can inhibit the torque generated in the transmitting device from exceeding the allowable torque.

The controller may be configured to stop driving of the motor when the value of the motor current detected by the detector reaches the upper limit current value.

The transmitting device may have a variable deceleration ratio for transmitting rotation of the motor to the output shaft and may be configured to vary the deceleration ratio by externally operating the transmitting device.

The controller may be configured to vary the upper limit current value in accordance with the deceleration ratio of the transmitting device such that the upper limit current value decreases with an increase in the deceleration ratio.

In this case, the torque generated in the transmitting device can be further inhibited from being larger than the allowable torque.

Alternatively, the controller may be configured to control driving of the motor such that, while the deceleration ratio of the transmitting device is large, the value of the motor current detected by the detector is equal to or smaller than the upper limit current value.

Likewise in this case, the torque generated in the transmitting device can be further inhibited from being larger than the allowable torque.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENT

The present embodiment describes a driver drill as an example of the electric working machine.

Figure 1:
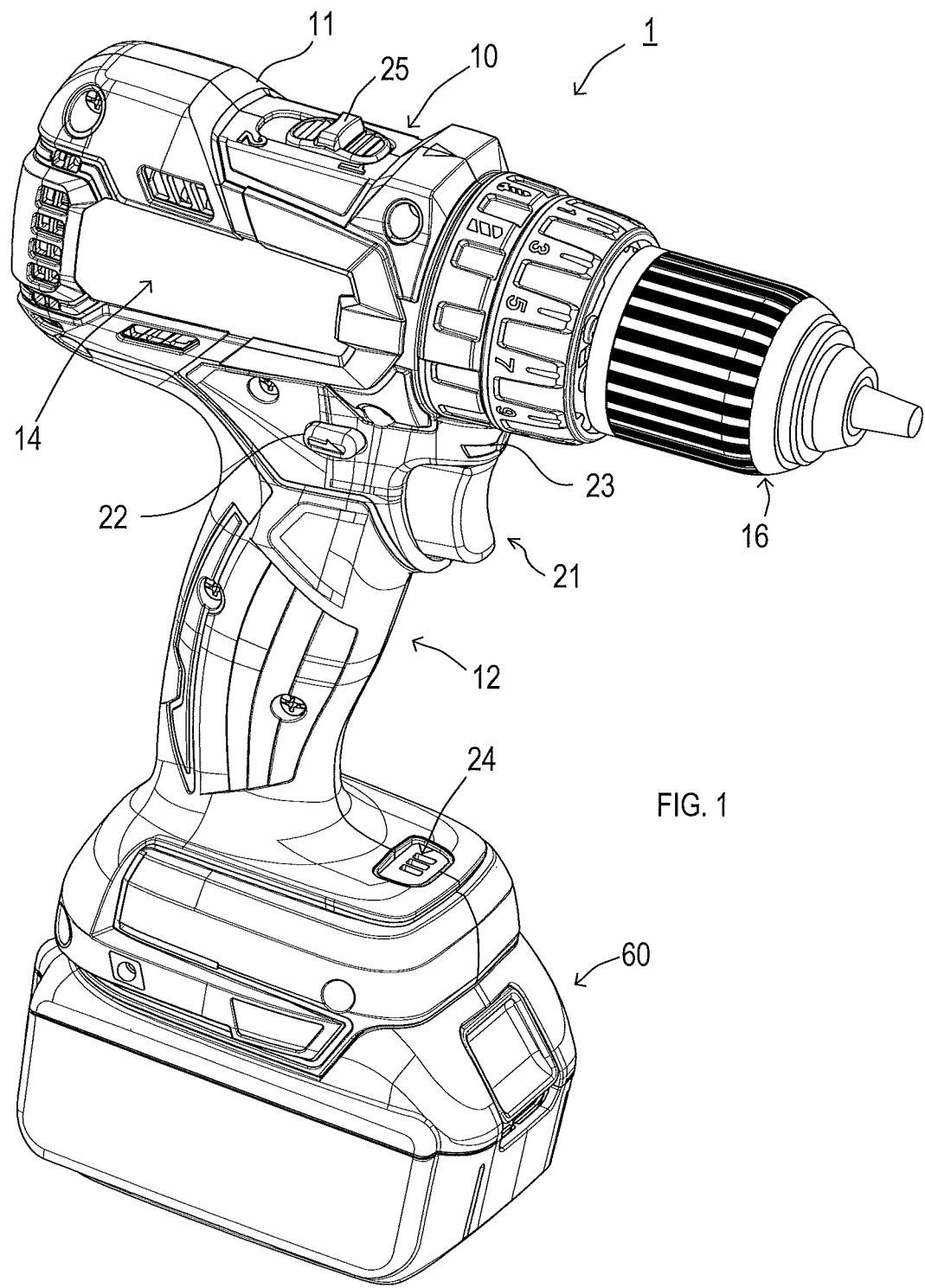
FIG. 1 is a perspective view showing an external appearance of a driver drill according to an embodiment.
Figure 2:
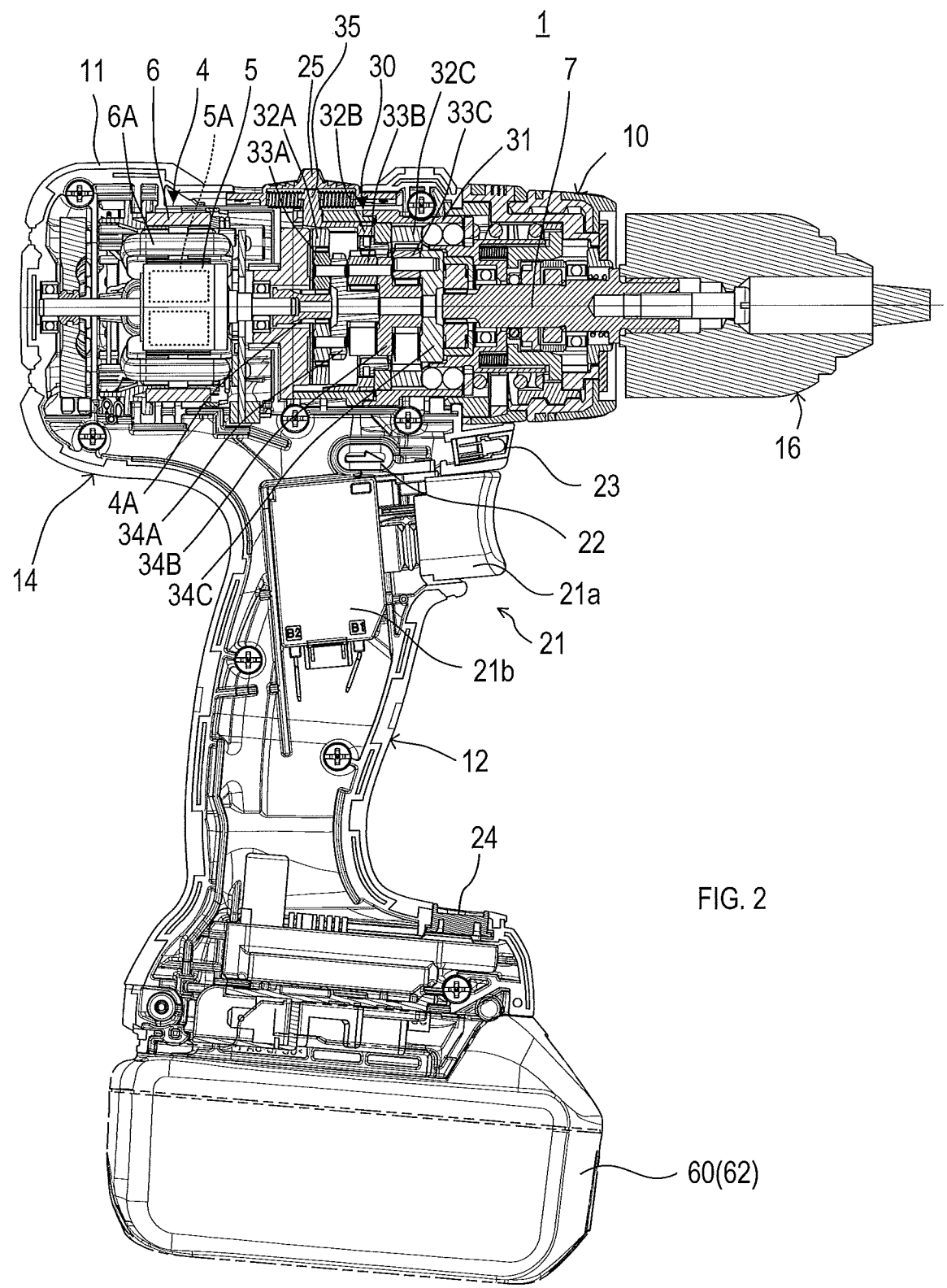
FIG. 2 is a sectional view showing an internal structure of the driver drill.

As shown in FIGS. 1 and 2, the driver drill 1 according to the present embodiment comprises a main body 10 and a battery pack 60 that supplies electric power to the main body 10.

The main body 10 comprises a housing 11 having a grip portion 12 protruding downward so as to be held in a user's hand. The housing 11 accommodates various components.

Behind the housing 11 (in the left side of the drawing), a motor storage 14 is provided so as to store a motor 4 that is the driving source of the driver drill 1. A deceleration mechanism 30 is housed in front of the motor storage 14 as a transmitting device.

At the leading end of the housing 11 (in the right side of the drawing), a chuck portion 16 is provided in a protruding manner so as to attach a tool bit (not shown) to an output shaft 7 of the deceleration mechanism 30.

The grip portion 12 is provided with a trigger switch 21 for a user to operate with a finger while holding the grip portion 12.

The trigger switch 21 comprises an operating portion 21a to be pulled by a user and a switch main body portion 21b configured to be turned on in response to the operating portion 21a being pulled and configured such that a resistance value varies depending on an amount of operation (amount of pulling) of the operating portion 21a.

In the upper side of the trigger switch 21 (the lower-end side of the housing 11), a direction changeover switch 22 is provided to change the rotational direction of the motor 4 into a normal rotation direction or a reverse rotation direction.

In the lower-front portion of the housing 11, a lighting LED 23 is provided so as to shine the flash light in front of the driver drill 1 when the operating portion 21a is pulled.

In the lower-front portion of the grip portion 12, a remaining energy indicator 24 is provided that indicates the remaining energy of a battery 62 in the battery pack 60.

At the lower end of the grip portion 12, the battery pack 60 is detachably attached.

The battery pack 60 incorporates a battery 62 having, for example, 18V output voltage (battery voltage). The lower end of the grip portion 12 of the driver drill 1 is configured such that the battery pack 60 can be attached thereto by sliding the battery pack 60 from the front side to the rear side.

The battery 62 accommodated in the battery pack 60 is a rechargeable battery, such as a lithium ion rechargeable battery, which can be repeatedly recharged.

The motor 4 is an Interior Permanent Magnet (IPM) three-phase brushless motor configured such that a core of a rotor 5 is provided with through holes around a rotating shaft of the motor 4 and a permanent magnet 5A is embedded in each of the through holes.

The motor 4 is provided with a Hall IC 50 (see FIG. 3) that detects the rotational position of the motor 4. The Hall IC 50 is a known IC and comprises three Hall elements each disposed so as to correspond to each phase of the motor 4. The Hall IC 50 generates a rotation detection signal at every specified rotation angle of the motor 4.

The grip portion 12 is provided therein with a motor drive device 40 (see FIG. 3) that controls driving of the motor 4 with power supply from the battery pack 60.

A winding 6A is wound around a stator 6 of the motor 4. The winding 6A is small in wire diameter and the number of turns of the winding 6A is large so that the size of the motor 4 can be equalized with the size of a motor that is driven with power supply from a battery pack having a low voltage output.

In other words, for example, if a motor used for a driver drill that is operated with power supply from a battery pack having 10.8V output voltage (battery voltage) is driven with the battery pack 60 according to the present embodiment, the number of revolution of such motor becomes excessively high.

In this case, the number of revolution of the motor can be reduced by increasing the number of turns of the winding around the stator. However, the number of turns of the winding cannot be increased in a small motor driven by low voltage due to lack of space for increasing the number of turns.

Thus, in the present embodiment, the wire diameter of the winding 6A around the stator 6 of the motor 4 is small and the number of turning of the winding 6A is increased so that the motor 4 can be suitably driven by the battery pack 60 having high voltage output without changing the size of the motor 4 as compared to the small motor driven by lower voltage.

Figure 4:
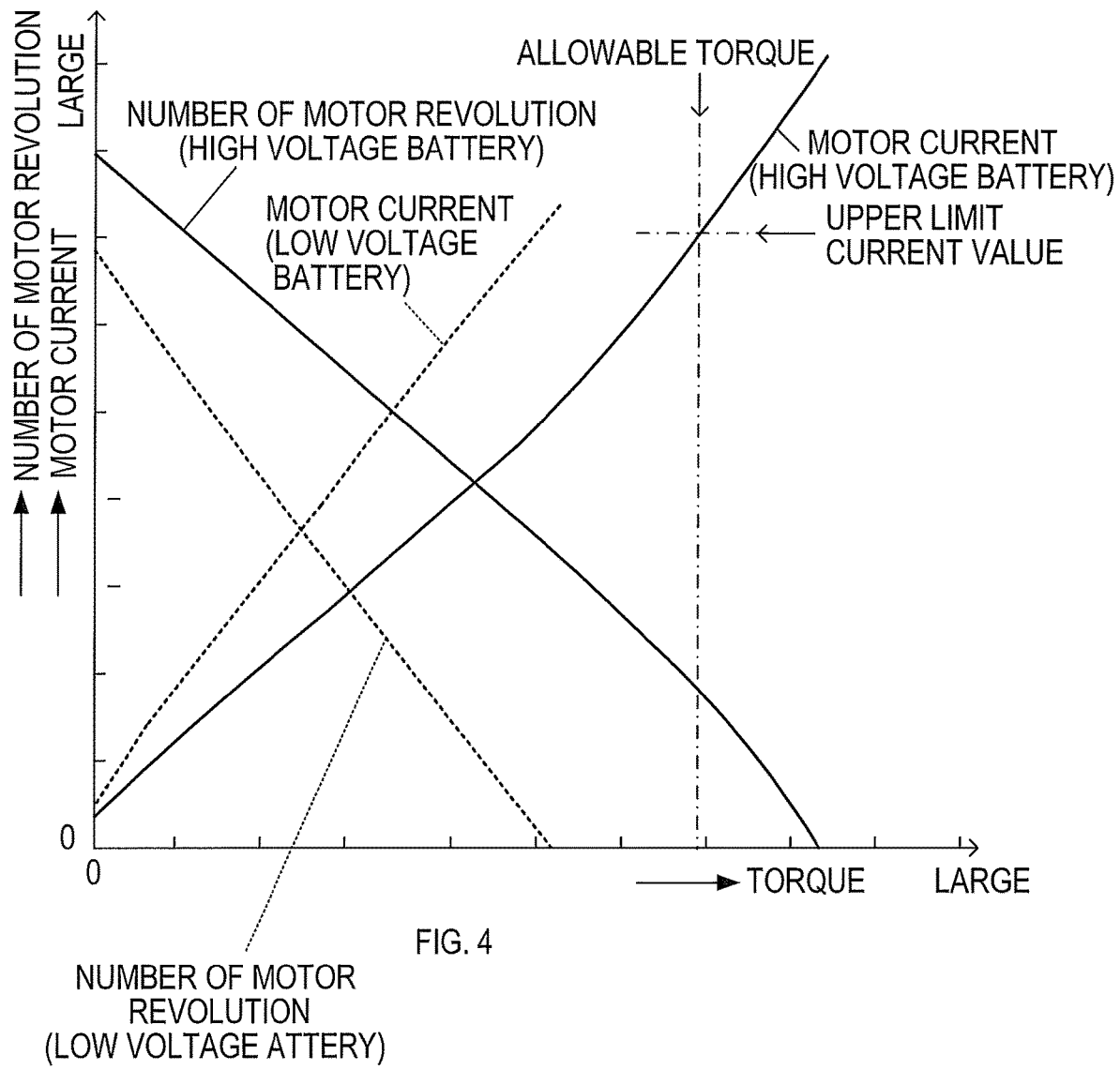
FIG. 4 is a characteristic diagram showing a relation between torque, transmitted from a motor via a transmitting device to an output shaft, and the number of motor revolution and motor current.

For example, in FIG. 4, the solid lines represent the characteristics of the relation among the number of revolution of the motor 4 for a high voltage battery according to the present embodiment, motor current, and torque. The dotted lines represent the characteristics of a motor for a low voltage battery.

As shown in FIG. 4, due to the decreased wire diameter of the winding 6A, the maximum number of revolution of the motor 4 according to the present embodiment during no-load operation (torque: 0) is set to the number of revolution (for example, 1600 rpm) that is slightly higher than the maximum number of revolution (for example, 1400 rpm) of a motor for a low voltage battery.

When the torque is increased due to load applied on the motor 4, the motor current is increased and the number of revolution of the motor 4 is decreased. For a motor driven by a low voltage battery, the motor current against the torque becomes larger than the motor current for the motor 4 according to the present embodiment and the number of revolution becomes smaller. Consequently, torque generated in the motor driven by the low voltage battery does not exceed, an allowable torque applicable to the deceleration mechanism 30.

With the same amount of motor current provided to a motor driven by a low voltage battery, the motor 4 according to the present embodiment that is driven by a high voltage battery can be driven by higher torque.

However, if excessively increased, torque exceeds the allowable torque transmittable by the deceleration mechanism 30, the deceleration mechanism 30 may be damaged. Accordingly, in the present embodiment, the upper limit value of motor current is set such that the torque generated due to energization of the motor 4 does not exceed the allowable torque of the deceleration mechanism 30, and the motor drive device 40 is configured to limit the value of the motor current to the upper limit electric current value or smaller.

The deceleration mechanism 30 is housed in a cylindrical gear case 31 and comprises a first set of planetary gears 33A, a second set of planetary gears 33B, and a third set of planetary gears 33C. The first to the third sets of planetary gears 33A, 33B, 33C revolve respectively in internal gears 32A, 32B, 32C secured to the inner circumferential surface of the gear case 31.

The internal gears 32A, 32B, 32C and the first to the third sets of planetary gears 33A, 33B, 33C are sequentially disposed from the side of the motor 4 toward the leading end of the housing 11 (the right side of the drawing) along the rotation shaft of the motor 4. The first set of planetary gears 33A are respectively disposed around the rotation shaft of the motor 4 at specific angular intervals. The second and the third sets of planetary gears 33B and 33C are disposed in the same manner as the first set of planetary gears 33A.

The first to the third sets of planetary gears 33A, 33B, 33C are rotatably supported by first to the third carriers 34A, 34B, 34C respectively disposed between the first and the second sets of planetary gears 33A and 33B, between the second and the third sets of planetary gears 33B and 33C, and close to the third sets of planetary gears 33C in the opposite side of the second set of planetary gears 33B.

The first to the third carriers 34A, 34B, 34C are rotatable on the rotating shaft of the motor 4. The first and the second carriers 34A and 34B are meshed with the second and the third sets of planetary gears 33B and 33C disposed closer to the leading-end than the first and the second sets of planetary gears 33A and 33B supported by the first and the second carrier 34A and 34B.

The first set of planetary gears 33A is meshed with a pinion gear 4A secured to the rotating shaft of the motor 4. To the third carrier 34C, the output shaft 7 of the driver drill 1 is secured.

Accordingly, the deceleration mechanism 30 of the present embodiment can decelerate the rotation of the motor 4 at three stages by the first to the third sets of planetary gears 33A to 33C and the first to the third carriers 34A to 34C and transmit the decelerated rotation to the output shaft 7.

The internal gear 32B to be meshed with the second set of planetary gears 33B is secured to a slide ring 35 that is movable inside the gear case 31 along the rotating shaft of the motor 4.

The slide ring 35 can be manually moved by a user via a deceleration operator 25 protruding outside the housing 11.

When a user operates the deceleration operator 25 to move the slide ring 35 from the leading end position shown in FIG. 2 to the rear end position that is toward the internal gear 32A, the second set of planetary gears 33B and the first carrier 34A are coupled by the internal gear 32B.

In this state, the first carrier 34A and the second carrier 34B are rotated together. Thus, the deceleration mechanism 30 decelerates the rotation of the motor 4 at two stages by the first and the third sets of planetary gears 33A and 33C and the first and the third carriers 34A and 34C and transmits the decelerate rotation of the motor 4 to the output shaft 7.

Accordingly, in the driver drill 1 of the present embodiment, when the deceleration operator 25 is in a forward position, the rotation of the motor 4 is decelerated at three stages and the output shaft 7 is rotated at low speed, whereas when the deceleration operator 25 is in a rearward position, the rotation of the motor 4 is decelerated at two stages and the output shaft 7 is rotated at high speed.

Such speed switching is suitably carried out by a user operating the deceleration operator 25. During the low-speed rotation, in which the rotation of the motor 4 is decelerated at three stages and the deceleration ratio becomes large, the torque corresponding to the motor current becomes larger as compared to the torque during the high-speed rotation.

Therefore, in the present embodiment, the deceleration operator 25 is provided with a position detector 26 configured to detect the position of the deceleration operator 25 so that the motor drive device 40 varies the above-described upper limit current value in accordance with the detection result.

In other words, the motor drive device 40 detects the deceleration ratio of the deceleration mechanism 30 from the position of the deceleration operator 25 and varies the upper limit current value so that the upper limit value of the motor current decreases with an increase in the deceleration ratio.

Since the detailed structure of the above-described deceleration mechanism 30 is described in the above-mentioned Japanese Unexamined Patent Application Publication No. 2002-154062 and publically known, further description thereof is omitted here.

The following describes the structure of the motor drive device 40.

Figure 3:
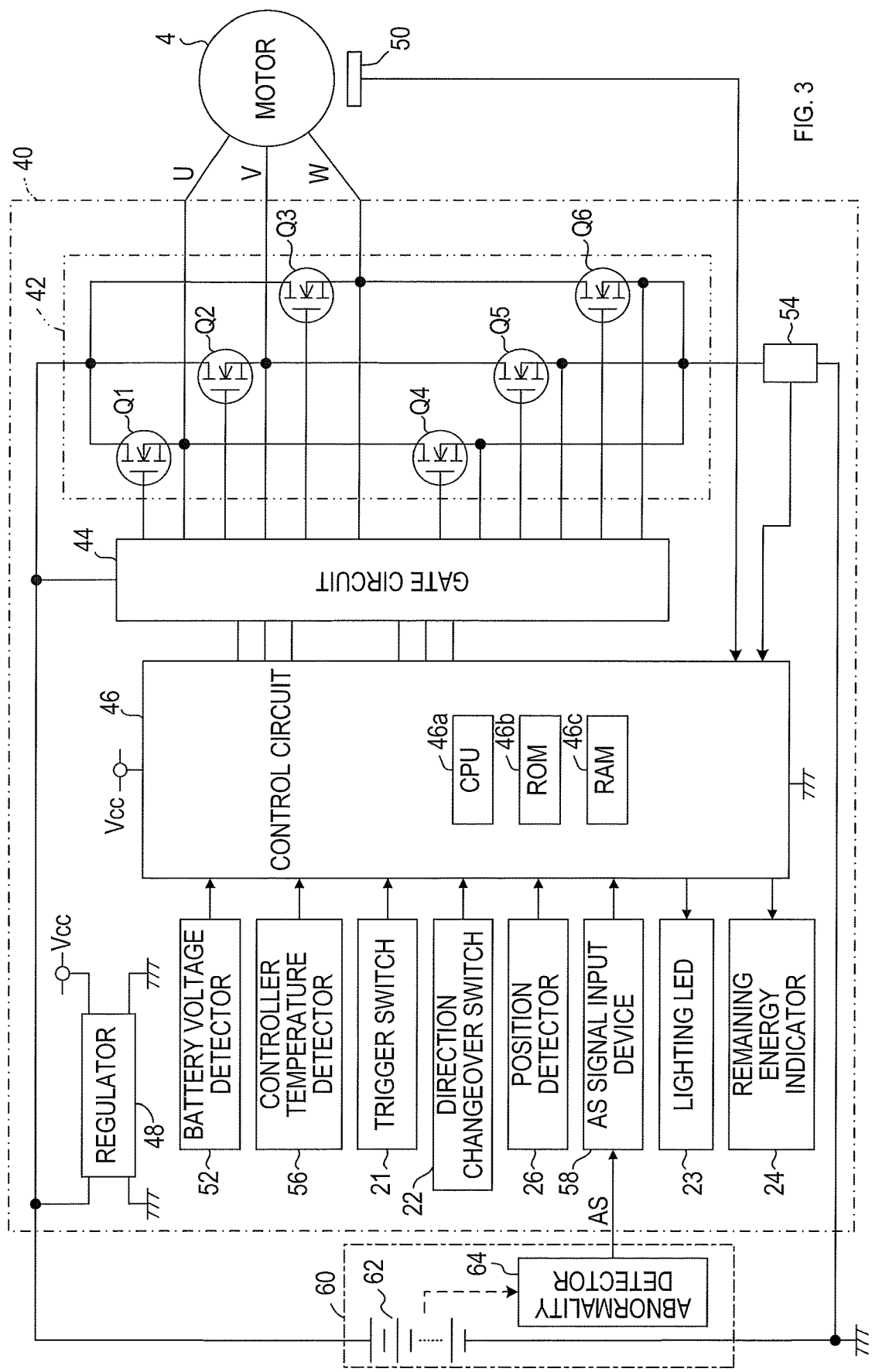
FIG. 3 is a block diagram showing a configuration of a motor drive device installed in the driver drill.

As shown in FIG. 3, the motor drive device 40 comprises a drive circuit 42, a gate circuit 44, a control circuit 46, and a regulator 48.

The drive circuit 42 is configured to run electric current in windings each provided for each phase of the motor 4 with power supply from the battery 62, and is configured as a three-phase full-bridge circuit, in the present embodiment, including six switching elements Q1 to Q6. Each of the switching elements Q1 to Q6 is a MOSFET in the present embodiment.

In the drive circuit 42, the switching elements Q1 to Q3 are provided as so-called high-side switches respectively disposed between terminals U, V, W of the motor 4 and the power source line coupled to the positive electrode of the battery 62.

Moreover, three switching elements Q4 to Q6 are provided as so-called low-side switches respectively disposed between terminals U, V, W of the motor 4 and a ground line coupled to the negative electrode of the battery 62.

The gate circuit 44 is configured to turn on and off each of the switching elements Q1 to Q6 of the drive circuit 42 in accordance with a control signal outputted from the control circuit 46 so as to run electric current in each winding of the motor 4 and rotate the motor 4.

The control circuit 46 comprises, in the present embodiment, a microcontroller including a CPU 46a, a ROM 46b, and a RAM 46c.

To the control circuit 46, the above-described trigger switch 21 (in particular, the switch main body portion 21b), the direction changeover switch 22, the lighting LED 23, the remaining energy indicator 24, and the position detector 26 are coupled.

In the motor drive device 40, a current path extending from the drive circuit 42 to the negative electrode of the battery 62 is provided with a current detection circuit 54 that detects the electric current flowing in the motor 4. A current detection signal is input from the current detection circuit 54 to the control circuit 46.

Moreover, the motor drive device 40 comprises a battery voltage detector 52 that detects supply voltage (battery voltage) from the battery 62 and a controller temperature detector 56 that detects the temperature of the motor drive device 40.

To the control circuit 46, detection signals from the detectors 52, 56 and the detection signal from the Hall IC 50 disposed in the motor 4 are input.

The motor drive device 40 further comprises an automatic stop (AS) signal input device 58 that captures an AS signal from an abnormality detector 64 disposed in the battery pack 60. To the control circuit 46, the AS signal is also input via the AS signal input device 58.

The AS signal is a signal to stop discharge of the battery 62 and is outputted from the battery pack 60 when the abnormality detector 64 provided in the battery pack 60 detects an abnormality, such as overcurrent, over-discharge, and overload.

The abnormality detector 64 in the battery pack 60 monitors the current, the voltage, and the temperature in the battery 62 so as to detect an abnormality, such as overcurrent (current), over-discharge (voltage), and overload (current and temperature). The control circuit 46 stops driving of the motor 4 when the AS signal is input from the AS signal input device 58 and stops discharge of the battery 62 associated with driving of the motor 4.

When the trigger switch 21 is operated, the control circuit 46 obtains the rotational position and the rotational speed of the motor 4 based on the rotation detection signal from the Hall IC 50 and drives the motor 4 in a specified rotational direction in accordance with a rotational direction setting signal from the direction changeover switch 22.

Moreover, while the motor 4 is being driven, the control circuit 46 sets the amount of control of the motor 4 in accordance with the amount of the operation (amount of pulling) of the trigger switch 21.

The amount of control of the motor 4 corresponds to the drive duty ratio of a control signal to be outputted to the gate circuit 44 so as to turn on and off the switching elements Q1 to Q6.

The control circuit 46 outputs the control signal corresponding to the amount of control (the drive duty ratio) that has been set as described above to the gate circuit 44 so as to rotationally drive the motor 4.

In addition to drive control of the motor 4, the control circuit 46 also controls to turn on and off the lighting LED 23 during motor drive, and further executes an indication process to indicate the remaining energy of the battery 62 on the remaining energy indicator 24.

The regulator 48 generates constant power supply voltage Vcc (for example, DC 5V) with power supply from the battery 62. The power supply voltage Vcc is necessary for the control circuit 46 to operate. The control circuit 46 operates with supply of the power supply voltage Vcc from the regulator 48.

The following describes an electric current limitation process among various control processes executed in the control circuit 46. The electric current limitation process is performed to monitor the motor current that flows in the motor 4 while the motor 4 is driven and to protect the deceleration mechanism 30 from excessive torque by stopping driving the motor 4 when the motor current exceeds the upper limit current value shown in FIG. 4.

Figure 5:
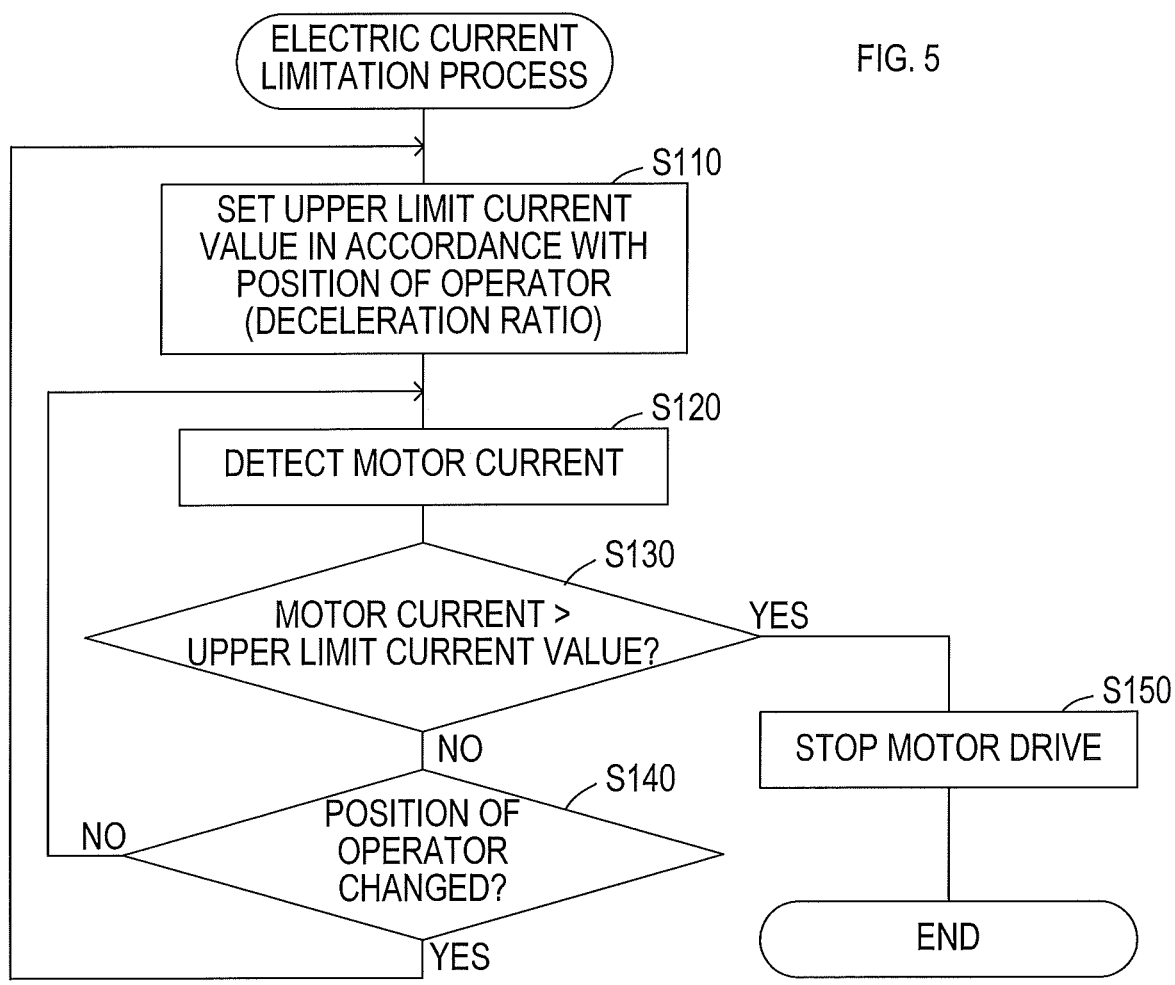
FIG. 5 is a flowchart illustrating an electric current limitation process executed in a control circuit so as to protect the transmitting device.

As shown in FIG. 5, in S110 of the electric current limitation process, the position of the deceleration operator 25 is detected by the position detector 26, and, based on the detection result, in other words, the deceleration ratio of the deceleration mechanism 30, the upper limit current value is set.

Specifically, when the deceleration ratio of the deceleration mechanism 30 is large and the rotation of the output shaft 7 is set to low speed, the upper limit current value is set smaller than the upper limit current value in a case in which the rotation of the output shaft 7 is set to high-speed so as to limit the torque applied to the deceleration mechanism 30 to the allowable torque or smaller. On the other hand, when the deceleration ratio of the deceleration mechanism 30 is small and the rotation of the output shaft 7 is set to high speed, the upper limit current value is set such that the upper limit current value becomes larger than in a case in which the rotation of the output shaft 7 is set to low speed.

In S120, based on the detection signal outputted from the current detection circuit 54, serving as a detector, the motor current actually flowing in the motor 4 is detected.

In S130, it is determined whether the motor current detected in S120 exceeds the upper limit current value set in S110. If it is determined that the motor current has not exceeded the upper limit current value, the process proceeds to S140.

In S140, based on the detection signal from the position detector 26, it is determined whether the position of the deceleration operator 25 has been changed. If it is determined that the position of the deceleration operator 25 has been changed, the process goes to S110 to reset the upper limit current value and execute the processes in S120 and the following steps. In S140, if it is determined that the position of the deceleration operator 25 has not been changed, the process goes to S120 and the processes in S120 and the following steps are executed.

On the other hand, in S130, if it is determined that the motor current has exceeded the upper limit current value, the process proceeds to S150 to stop driving of the motor 4 and terminate the electric current limitation process since the torque applied to the deceleration mechanism 30 exceeds the allowable torque and may damage the deceleration mechanism 30.

As described above, in the driver drill 1 according to the present embodiment, the value of the motor current is limited to the upper limit current value or smaller as shown in FIG. 4 so that the maximum torque that can be generated due to energization of the motor 4 does not exceed the allowable torque transmittable by the deceleration mechanism 30. If the value of the motor current exceeds the upper limit current value, driving of the motor 4 is stopped.

Accordingly, damaging the deceleration mechanism 30 can be inhibited even when the maximum torque that can be generated by energization of the motor 4 becomes larger than the allowable torque transmittable by the deceleration mechanism 30 due to the battery voltage supplied from the battery pack 60 and the configurations of the motor 4 and the drive circuit 42.

Moreover, although the battery pack 60 in the present embodiment has a high voltage output, in order to equalize the size of the motor 4 to the size of a motor driven with power supply from a battery pack having a low voltage output, the winding 6A is small in the wire diameter and the number of turns of the winding 6A is increased as compared to such motor.

Despite the use of the battery pack 60 having high voltage output, the driver drill 1 according to the present embodiment does not require an increase in the size of the motor 4 or the deceleration mechanism 30 as compared to a driver drill using a battery pack having low voltage output.

Accordingly, the driver drill 1 using the battery pack 60 having high voltage output can be downsized to the size of a driver drill for low voltage use.

In the present embodiment, the control circuit 46 corresponds to one example of the controller in the present disclosure, the drive circuit 42 and the gate circuit 44 correspond to one example of the drive device in the present disclosure, and the current detection circuit 54 corresponds to one example of the detector in the present disclosure.

The above has described one embodiment of the electric working machine according to the present disclosure, the electric working machine according to the present disclosure is not limited to the above-described embodiment but can be embodied in various ways.

For example, in the above-described embodiment, the transmitting device comprises the deceleration mechanism 30 that can vary the deceleration ratio into two levels via the deceleration operator 25 such that the control circuit 46 sets the upper limit current value for each deceleration ratio to limit the motor current.

Figure 6:
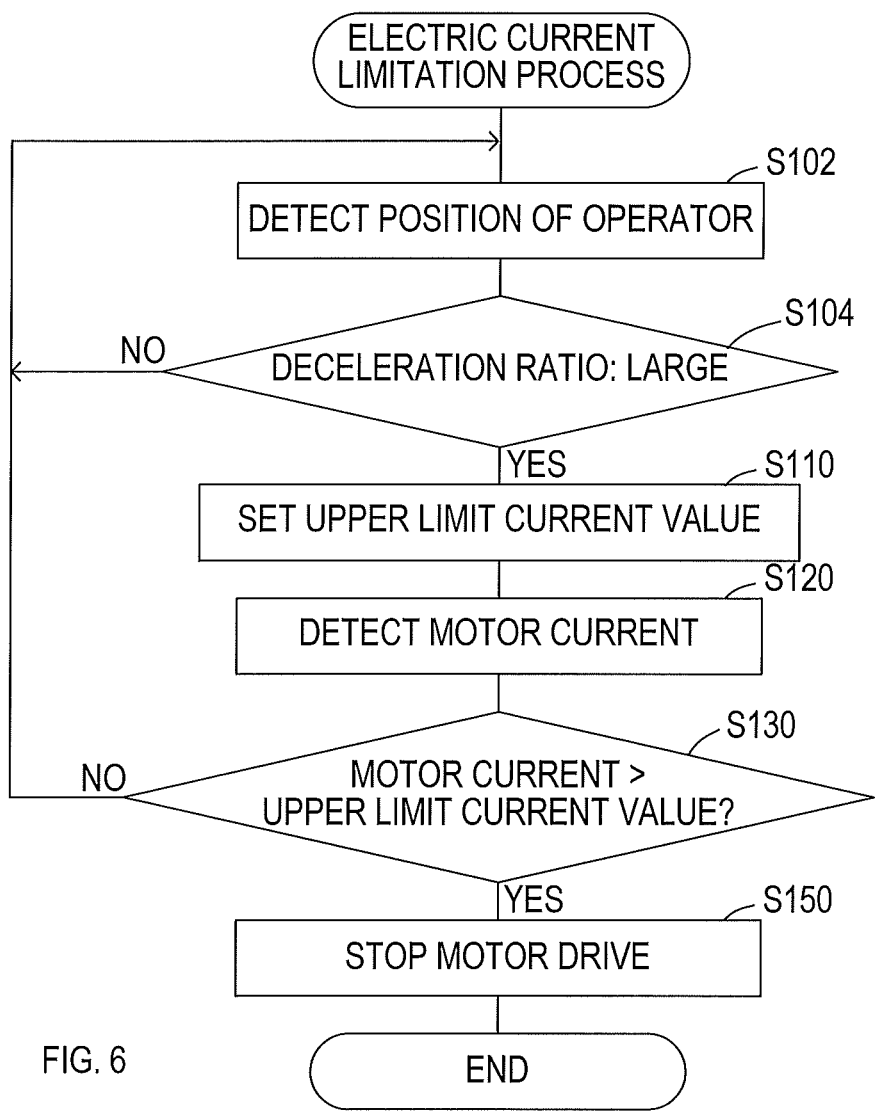
FIG. 6 is a flowchart illustrating a modified example of the electric current limitation process.

For such configuration, the electric current limitation process may be executed in accordance with the procedure shown in FIG. 6 so that the upper limit current value is set so as to limit the value of the motor current to the upper limit current value or smaller only when the deceleration ratio of the deceleration mechanism 30 is large.

In other words, the electric current limitation process shown in FIG. 6 is executed as follows. In S102, the position of the deceleration operator 25 is detected. In S104, it is determined whether the position of the deceleration operator 25 is for "large" deceleration ratio, and if it is determined that position of the deceleration operator 25 is not for "large" deceleration ratio, the process proceeds to S102.

If it is determined in S104 that the position of the deceleration operator 25 is for "large" deceleration ratio, the process proceeds to S110 wherein the upper limit current value is set for a state wherein the deceleration ratio of the deceleration mechanism 30 is large. Subsequently, in S120, the value of the motor current is detected, and in S130, it is determined whether the value of the motor current has exceeded the upper limit current value.

If it is determined in S130 that the value of the motor current has not exceeded the upper limit current value, the process proceeds to S102. If it is determined in S130 that the value of the motor current has exceeded the upper limit current value, the driving of the motor 4 is stopped in S150, and then the electric current limitation process is terminated.

Even if the electric current limitation process is executed in this manner, the torque to be applied to the deceleration mechanism 30 can be limited to the allowable torque or smaller while the deceleration ratio of the deceleration mechanism 30 is increased and the output shaft 7 is driven at low speed. Therefore, the deceleration mechanism 30 can be protected.

Moreover, the above-described embodiment has described that the microcomputer included in the control circuit 46 executes the electric current limitation process such that the control circuit 46 limits the value of the motor current that flows when the motor 4 is driven to the upper limit current value or smaller.

This function may be achieved by an electric circuit configured to interrupt the current path to the motor when, for example, a comparator provided in the control circuit 46 determines that the value of the motor current has reached the upper limit current value.

Moreover, the above-described embodiment has described that when the value of the motor current reaches the upper limit current value, driving of the motor 4 is stopped. However, to protect the deceleration mechanism 30, simply limiting the value of the motor current to the upper limit current value or smaller is required and stopping driving of the motor 4 is not always necessary.

Although the battery in the battery pack 60 is directly coupled to the drive circuit 42 in the motor drive device 40 in the above-described embodiment as shown in FIG. 4, a fuse may be provided in series with respect to a lead wire coupling the battery pack 60 and the motor drive device 40.

Such a configuration can inhibit short circuit current from flowing from the battery pack 60 due to short circuit in the regulator 48, the gate circuit 44, and the drive circuit 42. In this case, the same effect can be achieved by disposing a fuse on the current path to the motor 4 of motor drive device 40.

Moreover, the above-described embodiment has described that the motor 4 is an IPM brushless motor in which a permanent magnet is embedded in the rotor 5. Alternatively, a Surface Permanent Magnet (SPM) brushless motor in which a magnet is disposed on the surface of the rotor may be used. Furthermore, the motor 4 may be a brushed motor.

Furthermore, the above-described embodiment has described an electric working machine in which the amount of control on the motor 4 is set in accordance with the amount of operating (the amount of pulling) the trigger switch 21 by a user. The present disclosure may be applicable to an electric working machine configured such that the amount of control on the motor is maintained at a constant amount once the trigger switch 21 is pulled a specific amount irrespective of further pulling, or an electric working machine configured with an on-off switch for driving a motor.

Still furthermore, in the above-described embodiment, the driver drill 1 is given as one example of the electric working machine. The electric working machine according to the present disclosure may be any type of electric working machine that drives a motor with electric supply from a battery. An example of such electric working machine includes an electric power tool for masonry work, metalworking, woodwork, or gardening.

Specifically, the present disclosure may be applied to various electric working machines including an electric hammer, an electric hammer drill, an electric drill, an electric driver, an electric wrench, an electric grinder, an electric reciprocating saw, an electric jigsaw, an electric hammer, an electric cutter, an electric chainsaw, an electric plane, an electric circular saw, an electric nailer (including an electric tacker), an electric hedge trimmer, an electric lawn mower, an electric lawn trimmer, an electric grass cutter, an electric cleaner, and an electric blower.

A plurality of functions possessed by one component in the above-described embodiment may be achieved by a plurality of components, or one function possessed by one component may be achieved by a plurality of components. Furthermore, a plurality of functions possessed by a plurality of components may be achieved by one component, or one function achieved by a plurality of components may be achieved by one component. Moreover, the configuration of the above-described embodiment may be partially omitted. At least a part of the configuration of the above-described embodiment may be added to or altered with the configurations of other embodiments. Various aspects included in the technical ideas specified by the expressions used in the claims correspond to the embodiments of the present disclosure.

Still furthermore, the technique according to the present disclosure can be achieved by, in addition to the electric working machine, various ways including a system comprising the electric working machine as a component, a program for a computer to function as the electric working machine, a non-transitory recording medium, such as a semiconductor memory, having this program recorded therein, or a method for controlling an electric working machine.

What is claimed is:

1. An electric working machine comprising:
an output shaft;
a motor;
a transmitting device having a maximum transmittable allowable torque and configured to transmit rotation of the motor to the output shaft;
a drive device configured to energize the motor with electric supply from a battery;
a controller configured to control driving of the motor via the drive device in accordance with a command;
a current path extending from the battery via the drive device to the motor and configured to energize the motor with a current value larger than an allowable current value required to generate the maximum transmittable allowable torque or smaller in the transmitting device due to rotation of the motor; and
a detector configured to detect a value of motor current flowing in the motor via the drive device, wherein:
the transmitting device has a variable deceleration ratio for transmitting rotation of the motor to the output shaft and is configured to vary the deceleration ratio,
the controller is further configured to control driving of the motor such that the value of the motor current detected by the detector is equal to or smaller than an upper limit current value that is smaller than the allowable current value, and
the controller is configured to vary the upper limit current value in accordance with the deceleration ratio of the transmitting device such that the upper limit current value decreases with an increase in the deceleration ratio.

2. The electric working machine according to claim 1, wherein the controller is configured to stop driving of the motor when the value of the motor current detected by the detector reaches the upper limit current value.

3. An electric working machine comprising:
an output shaft;
a motor comprising a stator with a winding wound therearound, the motor being configured to be driven with power supply from a battery having a first output voltage, the winding being small in wire diameter and being large in winding numbers as compared to a similar motor that is driven by a similar battery having a second output voltage, the first output voltage being higher than the second output voltage,
a transmitting device having a maximum transmittable allowable torque and configured to transmit rotation of the motor to the output shaft;
a drive device configured to energize the motor with power supply from the battery;
a controller configured to control driving of the motor via the drive device in accordance with a command; and
a current path extending from the battery via the drive device to the motor and configured to be able to energize the motor with a current value larger than an allowable current value required to generate the maximum transmittable allowable torque or smaller in the transmitting device due to rotation of the motor.

4. The electric working machine according to claim 3, wherein the first output voltage is at least 18 volts.

\* \* \* \* \*